Sept. 2, 1969   N. A. HURST ETAL   3,464,099
MANUFACTURE OF PLASTIC ARTICLES
Filed Dec. 14, 1966   5 Sheets-Sheet 1

NORMAN ASHCROFT HURST
THOMAS EDWARD HORACE GRAY
JAMES JONES-HINTON
               INVENTORS
By Rauber & Lazer
            THEIR ATTORNEYS

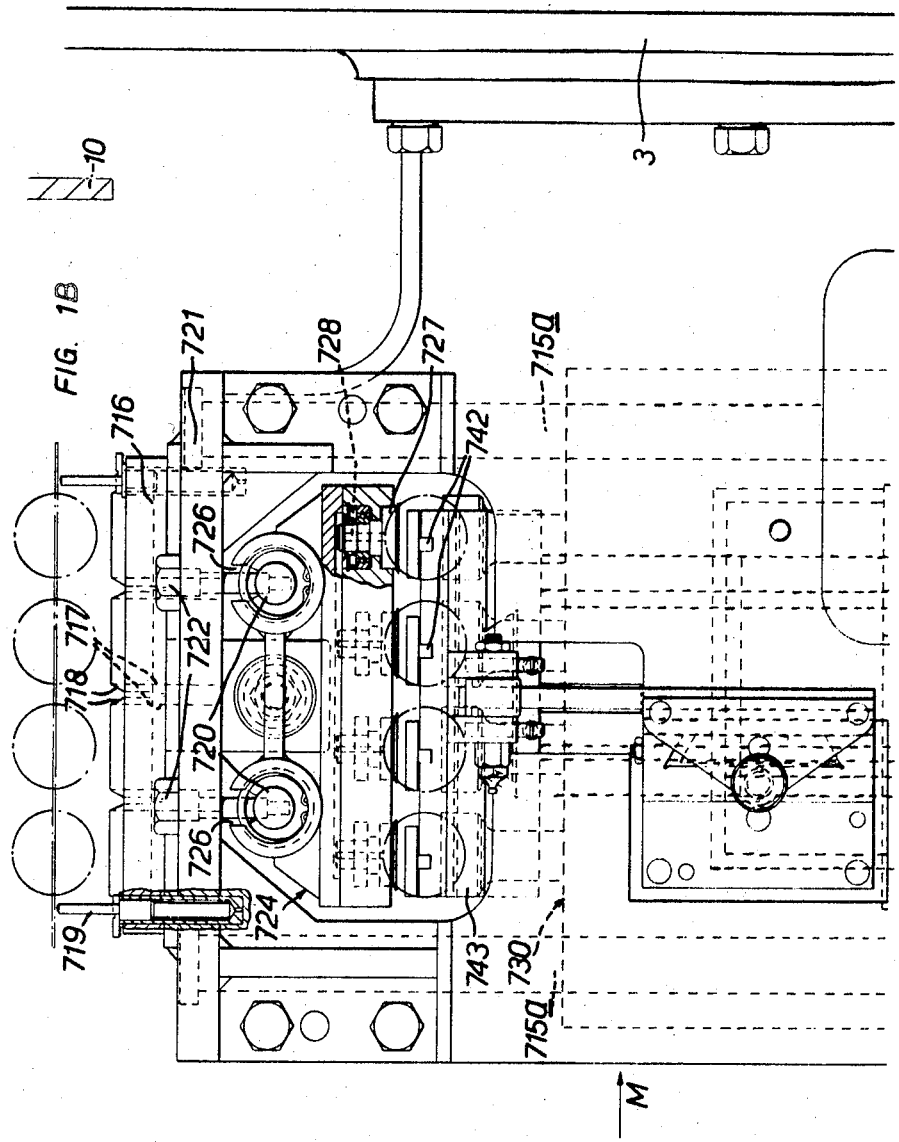

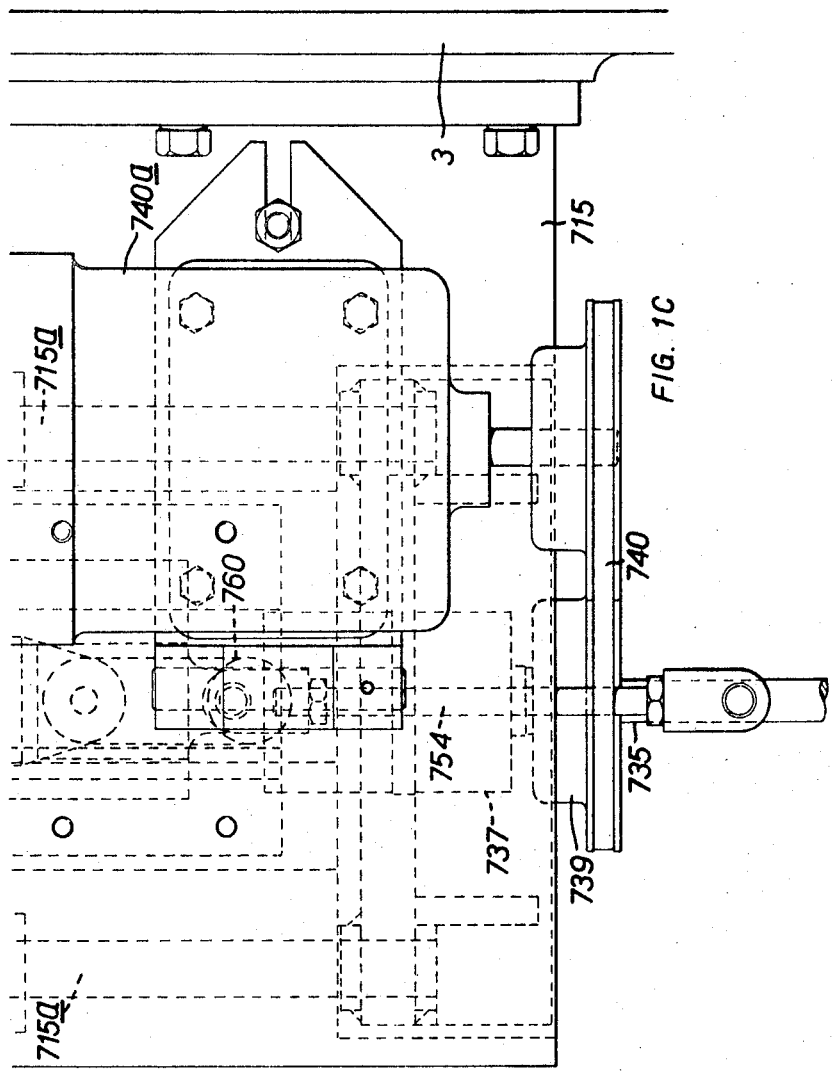

| United States Patent Office | 3,464,099
Patented Sept. 2, 1969 |
|---|---|

1

3,464,099
MANUFACTURE OF PLASTIC ARTICLES
Norman Ashcroft Hurst, Four Oaks, Thomas Edward
Horace Gray, Sutton Coldfield, and James Jones-
Hinton, Tanworth-in-Arden, England, assignors to
Dunlop Rubber Company Limited, London, England, a
British company
Filed Dec. 14, 1966, Ser. No. 601,731
Claims priority, application Great Britain, Dec. 15, 1965,
53,345/65
Int. Cl. B21h *1/14;* B21d *53/12*
U.S. Cl. 29—148.4        14 Claims

ABSTRACT OF THE DISCLOSURE

A method and apparatus for trimming surplus material from the equatorial region of an article, such as a table tennis ball, in two stages, firstly by passing the article through a hollow die to crop off part of the surplus and then rotating the article while mounted on a spindle to trim substantially the remainder. A pointed tool is used which can be moved to follow the required profile of the article in the trimming region.

---

Figure 1A:
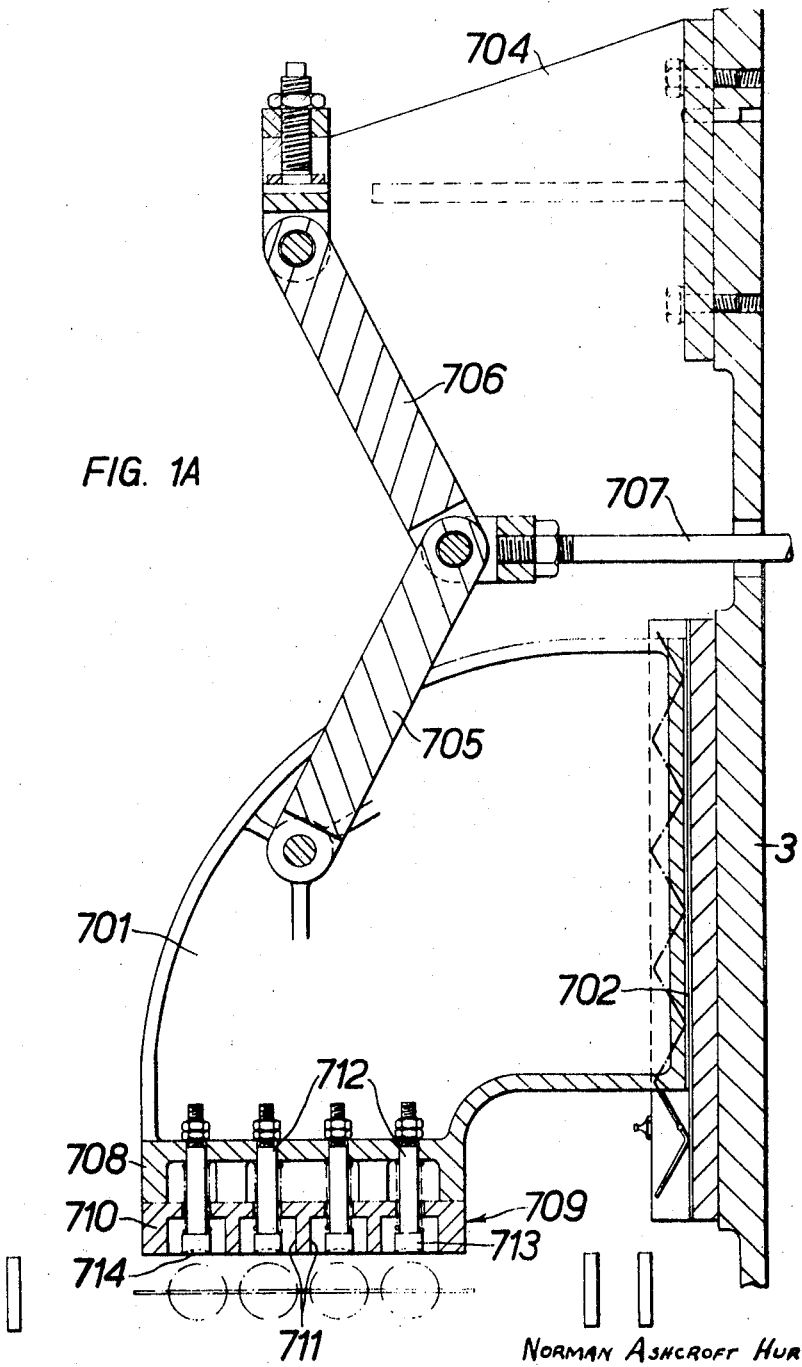

This invention relates to the manufacture of plastic articles and more particularly to an improved method and apparatus for removing surplus material from the equatorial region of an article, e.g. a spherical, ovoid or cylindrical article, formed in a sheet of plastic material.

According to the invention, a method of removing surplus material from an equatorial region of an article comprises locating the article on a hollow die with the surplus material in engagement with a circular cutting edge of the die, moving the article past the cutting edge and through the die to crop a substantial part of the surplus material from the article and to be received by a rotatable spindle, said equatorial region being substantially at right-angles to the axis of rotation of the spindle, rotating the spindle with the article mounted thereon and trimming substantially the remainder of the surplus material from said article by applying trimming means to said equatorial region.

Preferably the method also comprises forming a predetermined shape on the article, said trimming means being movable about said equatorial region in a predetermined manner.

The invention also includes a method of removing surplus material from the equatorial regions of a plurality of articles formed in a single sheet of material comprising locating the sheet so that the articles therein are located one on each of a plurality of hollow circular dies with the junctions of the sheet and the articles in engagement with circular cutting edges of the dies, moving the articles past the cutting edges and through the dies to crop a substantial part of the surplus sheet material from the articles and so that the articles are received by a plurality of rotatable spindles, one of each article, said equatorial regions being substantially at right-angles to the axes of rotation of their respective spindles, rotating the spindles with the articles mounted thereon and trimming substantially the remainder of the sheet from said articles by applying a trimming means to each of said articles.

According to the invention also, apparatus for removing surplus material from an equatorial region of an article said apparatus comprises a hollow die having a circular cutting edge, a rotatable spindle having an axis of rotation at right-angles to the plane of the cutting edge adapted to enter the die and to engage the spherical article and trimming means movable into contact with said equatorial region of the article mounted on the spindle.

In one form of the invention the apparatus is adapted to remove a plurality of articles from a single sheet of material and to trim surplus material from the equatorial regions of each of the articles said apparatus comprises a plurality of dies, spindles and trimming means one for each article.

Still further the invention includes an article in the manufacture of which a method or apparatus as defined above is used.

Figure 2A:
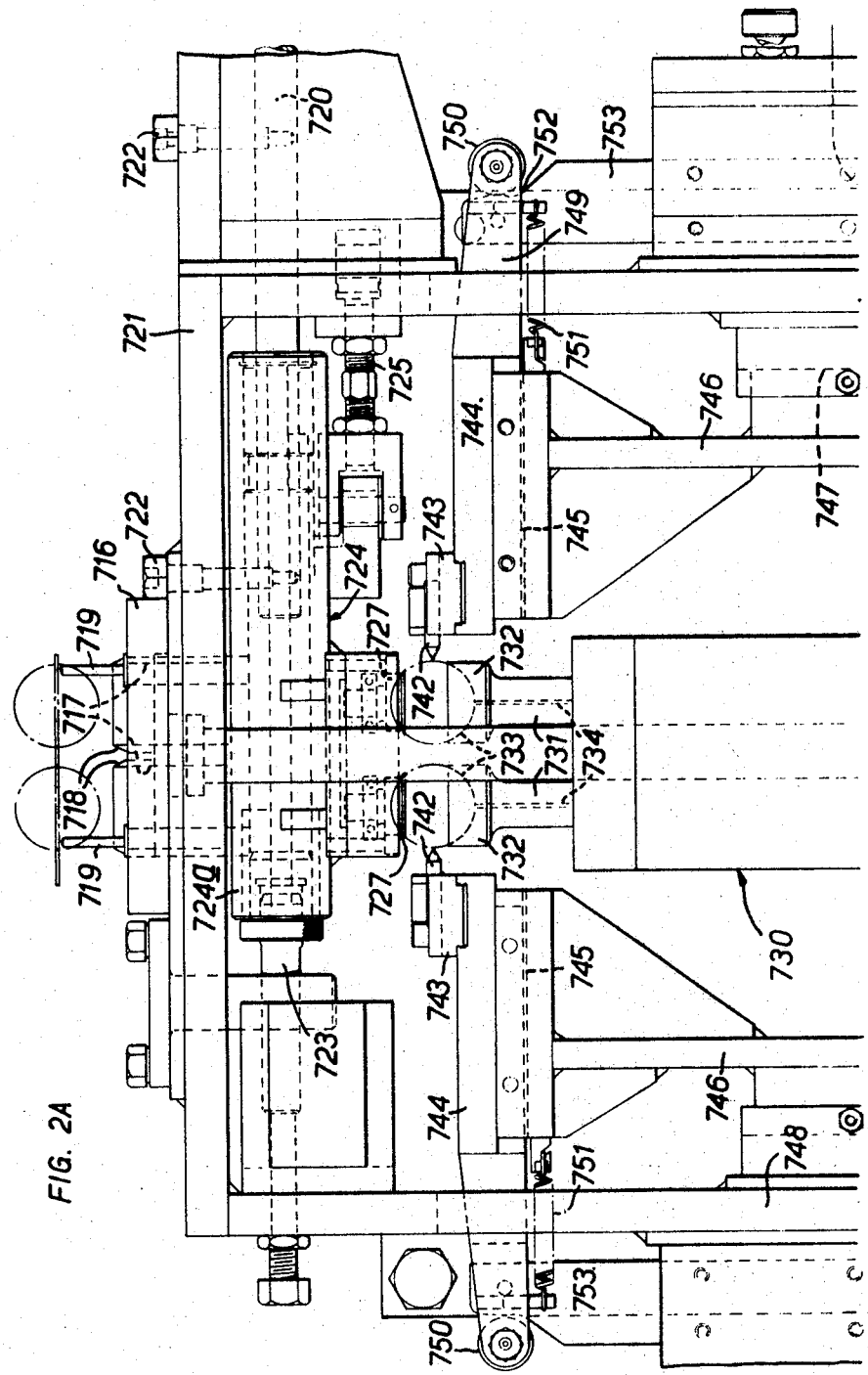
Figure 2B:
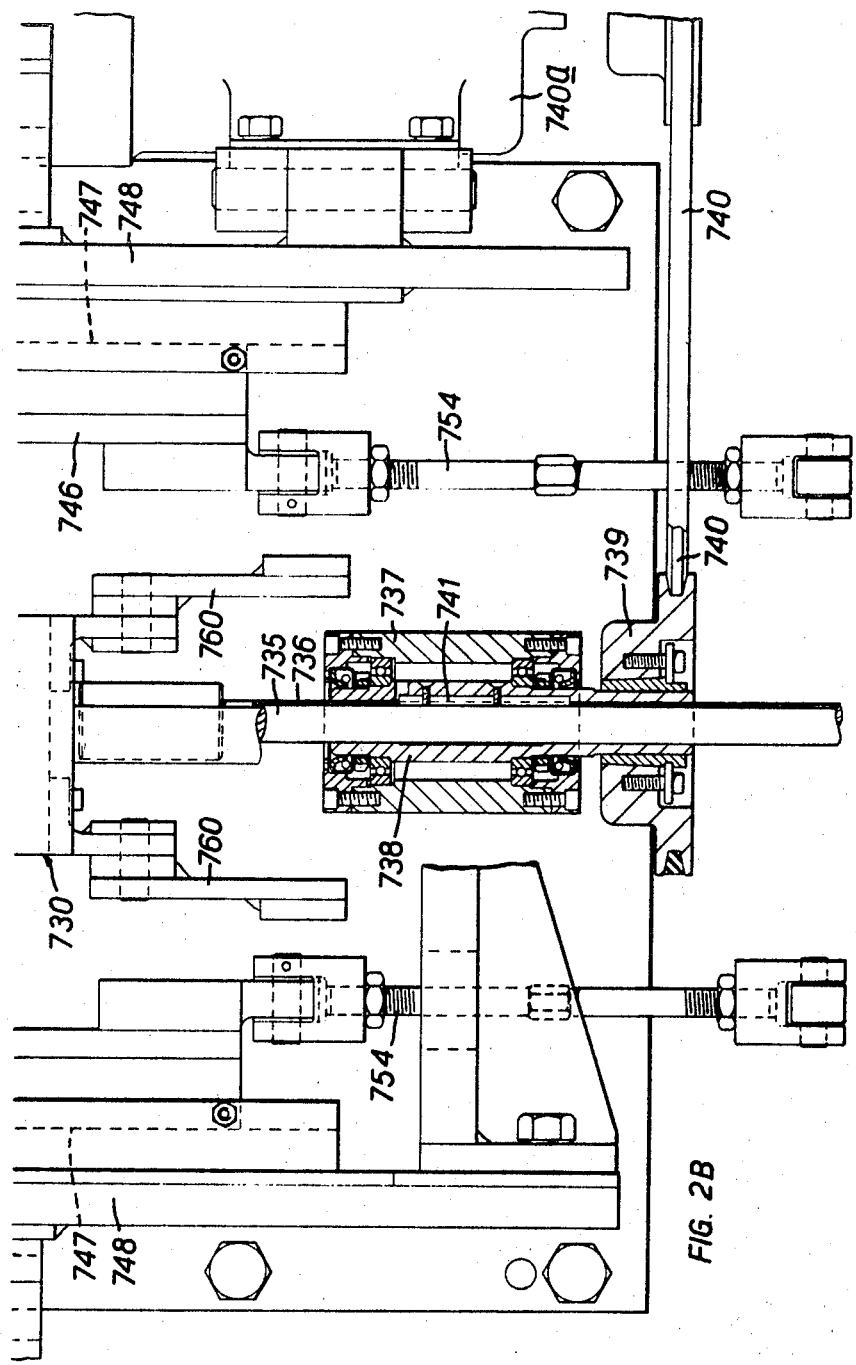

One embodiment of the invention will now be described, by way of example only, with reference to the accompanying drawings in which:

FIGURES 1A, 1B and 1C are side elevation views partly in section of the apparatus of the invention and FIGURES 2A and 2B are a front elevation of the apparatus shown in FIGURE 1B in the direction of arrow M of FIGURE 1B.

In one particular way of carrying out this method, eight spheres are formed in each double thickness of sheet. The apparatus described in this embodiment is for removing the eight spheres from the sheet and removing from the spheres any surface imperfection remaining after removal from the sheet.

A full description of a method and apparatus for the manufacture of table-tennis balls is contained in the specification of our co-pending patent application No. 53,346/65.

A right-angle swan-neck bracket 701 (FIGURE 1A) is mounted in a dovetail-slideway 702 fixed to the central leg 3 of a frame. Above the slideway a cantilever bracket 704 is also fixed to the frame. The two links 705 and 706 of a toggle mechanism are pivotally attached by one end of each respectively to the swan-neck bracket 701 and to the cantilever bracket 704. The other ends are pinned together and to the end of a push rod 707 linked to an upper bracket actuating cam (not shown). Movement of the push rod 707 causes the bracket 701 to slide vertically in the slideway 702.

On the lower end 708 of the swan-neck upper bracket 701, i.e., that end remote from the slidweay 702, is mounted a ball clamping assembly 709. The assembly comprises a plate 710 secured to the end 708 of the bracket 701 and having eight circular blind bores 711 formed therein, the open ends of the bores facing downwards. The bores 711 have a diameter slightly greater than the diameter of the spheres. Passing through the blind end of each bore is a spring-loaded clamping plunger 712. The ends of the plungers located in the bores have ball contacting pad 713 attached thereto which have ball engaging surfaces 714 of part-spherical shape.

An open-box-like framework 715 (FIGURE 1B) is secured by one side to the central leg 3 of the frame in a position below the swan-neck bracket 701.

A cropping plate 716 (FIGURE 2A) is secured to the upper surface of the framework 715. The plate comprises eight cutting dies in the form of eight bores 717 extending therethrough and around each bore is provided a cutting knife 718 which has a circular cutting edge protruding above the upper surface of the plate 716. The diameter of the cutting edge is slightly larger than the diameter of a ball and the diameter of the bore below the cutting edge is greater again than the diameter of the cutting edge so as to allow a ball to pass through the bore after being cropped from the sheet. Four reception plunger 719 are mounted at the corners of the plate and extend upwardly from the plate. The plungers 719 are lightly string-loaded so as to be urged in an upward direction away from the plate 716.

A pair of parallel tail stock mounting shafts 720 (FIGURES 1B and 2A) are suspended in a horizontal plane under upper members 721 of the box frame 715. A plurality of screws 722 for each shaft extend through the upper members 721 of the frame and into each shaft 720 so as to secure the shafts rigidly with respect to the frame. An adjustable stop 723 provided with a locating and centering shoulder is secured under the end of the upper member 721 of the frame remote from the shafts 720.

A multiple tail stock 724 is slidably mounted on the shafts 720 and is slidable by a cam and lever mechanism (not shown) operating on a push rod 725 from a position under the cropping plate 716 and in contact with the adjustable stop 723 to a position in a discharge station.

The tail stock 724 comprises a metal block 724a provided with two longitudinal bores adjacent the upper surface thereof, within which the shafts 720 are located. Grooves 726 are provided in the material of the block between the bores and the said upper surface to allow the screws 722 to enter the shafts and to allow the tail stock to slide along the shafts.

Eight metal suction pads 727 are rotatably mounted in the lower surface of the block for contacting the upper surface of a ball as will be seen. Each pad has a part spherical recess in its lower surface and a passageway 728 is provided to connect the recess to a source of vacuum.

Two vertical columns 715a extend between the upper members 721 and lower members of the box frame. A multiple headstock assembly 730 is located between the columns 715a and is slidable on the columns in a vertical direction. Eight spindles 731 extend from the upper surface of the headstock. Each spindle has a ball-holding pad 732 formed with a part-spherical recess 733 at its upper end which is complementarily shaped with respect to, and is adapted to receive, the lower part of the ball. The holding pads are of a cross-sectional shape such that they may pass into the bores 717 provided in the cropping plate 716. A passageway 734 extends from the ball engaging surface of each pad 732 for connection to a source of vacuum.

The spindles are rotatably driven in the same direction by gear trains in the headstock which are driven by a single headstock driving shaft 735 rotatably mounted in the headstock and extending below the headstock. The driving shaft has a keyway 736 therein extending the length of the shaft.

The headstock 730 is linked by link members 760 to a lever and push-rod system (not shown) to a cam on a cam shaft. Rotation of the cam causing the headstock 730 to move on the columns in a required manner.

Fixedly mounted on the columns at the bottom of the box frame is a drive housing 737. A hollow shaft 738 is rotatably mounted in the drive housing and has a pulley 739 mounted on its lower end which is driven by a driving belt 740 from an electric motor 740a mounted on the central leg of the frame.

A key 741 is secured to the inner surface of the hollow shaft and the headstock driving shaft 735 extends through the hollow shaft 738, the key 741 on the hollow shaft engaging in the keyway 736 on the driving shaft. Thus, the hollow shaft and driving shaft are relatively axially movable while remaining in driving engagement one with the other.

Trimming means in the form of eight single point cutting tools 742 are provided for trimming balls mounted on spindles. Four of the tools are mounted in each of two tool holders 743 located one at either side of the headstock. Each tool holder 743 is secured to a horizontal slide 744 which slides in a dovetail slideway 745 on the upper surface of a vertical slide 746. Each vertical slide is slidably mounted in a dovetail slideway 747 fixed to side members 748 of the frames. An extension 749 of the horizontal slide 744 carries at its end a profile follower in the form of a roller 750. Tension springs 751 are connected between the vertical slide 746 and the horizontal slide 744 and urge the tool inwardly towards the spindles 731 and the follower 750 each tool holder against an associated profile 752 formed on a profile plate 753 secured to the side member 748 of the box frame.

The vertical slides are linked by link members 754 to a lever system actuated by a cutting tool actuating cam (not shown) rotation of which causes vertical movement of the vertical slides 746 and of the horizontal slides 744 and cutting tools 742. This vertical movement causes the profile follower 750 to follow the profile 752 on the profile plate 753 to give a horizontal movement to the cutting tools.

The profile 752 is such that at the lowest vertical travel of the vertical slide 746 the cutting tools 742 are remote from the headstock 730 and at and about the highest vertical travel of the vertical slide the cutting tools follow the arc of a circle of a diameter equal to the required diameter of a ball, the point of each cutting tool being in contact with an equatorial region of a ball mounted between the tail-stock 724 and the headstock 730.

The sequence of operations performed in the apparatus will now be described.

A sheet with eight spheres formed therein (shown in chain dotted lines in the figures) is deposited on the reception plungers 719. The spheres have a weld line about the equatorial regions thereof. The tailstock 724 is located in the discharge station that is to the right as seen in FIGURE 2A, the cutting tools 742 are in their remote horizontal and vertical position, and the spindles 731 are in their highest vertical position, such that the centre of the sphere defining the recess 733 in a ball holding pad 732 is above the centre of the sphere of which the circular cutting edge of the cutting knife 718 is a great circle.

Rotation of the upper bracket actuating cam causes actuation of the links 705 and 706 of the toggle mechanism to lower the upper bracket 701 to engage the ball contacting pads 713 with the upper surface of the spheres. Further downward movement of the bracket presses the reception plungers 719 down and presses the sheet towards the cutting knives 718 until the holding pads 732 on the spindles 731 engage the lower surfaces of the spheres. The passageways 734 in the spindles are connected to a source of vacuum to firmly seat the spheres on the spindles.

Further downward movement of the bracket 701 causes compression of the springs of the clamping plungers 712 and entry of the upper part of the spheres into the blind bores 711 in the mounting plate 710 and the surface of the plate to contact the sheet. During the final part of the downward movement of the upper bracket 701 the headstock 730 is moved downward at the same rate as the bracket so that the whole sheet approaches the cutting knives 718 and the edges of the bores 711 act as bolsters for the cutting knives as the balls are moved into the bores 717 in the cropping plate 716 and cropped from the sheet.

During and after the cropping of the balls from the web the headstock 730 continues the downward movement, the spring-loaded clamping plunger 712 ensuring that the balls move through the narrow upper end of the bores 717 and remain fast to the holding pads 732, so that the equatorial regions of the spheres are at right-angles to the axes of rotation of the spindles.

After the cropping operation the upper bracket 701 is raised to allow the reception plungers 719 to lift the scrap web of material for subsequent transfer to the discharge station.

The headstock 730 is lowered, the headstock driving shaft 735 sliding in the hollow drive shaft 741, until the balls are below the level of the lowest surface of the tailstock 724. The cam and lever mechanism is actuated to slide the tailstock along the shafts 720 until it contacts the centering and locating shoulder on the adjustable stop 723. The headstock is now raised until the upper surfaces of the balls engage the spherical shaped recesses in the suction paids 727. The passageways 728 opening to said recesses are connected to a source of vacuum.

The balls are now accurately centered between the tailstock 724 and headstock 730. Also, the weld lines are in substantially horizontal plane.

The electric motor 740a is started to rotate the spindles 731 and thus the balls, by means of the belt 740, hollow shaft 741, driving shaft 735, and gear trains in the headstock 730.

Rotation of the cutting tool actuating cam now allows each vertical slide 746 to move vertically upwardly and the profile followers 750 to follow the profiles 752 so that the points of the cutting tools 742 contact the balls and form a predetermined shape on the balls. The tools are actuated so that each will traverse a circular arc, the diameter of which is the required diameter of the balls, about the weld line at the equatorial region of the ball to trim any surplus material. This position is shown in FIGURE 2A.

When the trimming is finished the cutting tools 742 are retracted, the vacuum source is disconnected from the passageways 734 in the spindles 731, and the headstock 730 lowered. The tailstock 724 carrying the finished balls is now moved along the shafts 720 to the discharge station.

Having now described our invention, what we claim is:

1. A method of removing surplus material from an equatorial region of an article comprising locating the article on a hollow die with the surplus material in engagement with a circular cutting edge of the die, moving the article past the cutting edge and through the die to crop a substantial part of the surplus material from the article and to be received by a rotatable spindle, said equatorial region being substantially at right-angles to the axis of rotation of the spindle, rotating the spindle with the article mounted thereon and trimming substantially the remainder of the surplus material from said article by applying trimming means to said equatorial region.

2. A method according to claim 1 comprising forming a predetermined shape on the article, said trimming means being movable about said equatorial region in a predetermined manner.

3. A method of removing surplus material from the equatorial regions of a plurality of articles formed in a single sheet of material comprsing locating the sheet so that the articles therein are located one on each of a plurality of hollow circular dies with the junctions of the sheet and the articles in engagement with circular cutting edges of the dies, moving the articles past the cutting edges and through the dies to crop a substantial part of the surplus sheet material from the articles and so that the articles are received by a plurality of rotatable spindles, one for each article, said equatorial regions being substantially at right-angles to the axes of rotation of their respective spindles, rotating the spindles with the articles mounted thereon and trimming substantially the remainder of the sheet from said articles by applying a trimming means to each of said articles.

4. A method according to claim 3 comprising trimming the articles so as to form a predetermined shape on the articles, said trimming means being movable about said equatorial regions in a predetermined manner.

5. A method according to claim 4 wherein the article or articles is or are received on the spindle or spindles prior to the cropping therefrom of the said surplus material.

6. Apparatus for removing surplus material from the equatorial region of an article, said apparatus comprising a hollow die having a circular cutting edge, a rotatable spindle having an axis of rotation at right-angles to the plane of the cutting edge adapted to enter the die and to engage the article, and trimming means movable into contact with said equatorial region of the article mounted on the spindle.

7. Apparatus according to claim 6 wherein the surface of the spindle which engages the article is shaped complementarily to that portion of the article it engages.

8. Apparatus according to claim 7 wherein a passageway for connection to a vacuum source extends through said spindle and leads to said surface for engaging the article.

9. Apparatus according to claim 8 wherein means are provided for moving the spindle between a position wherein that portion of the spindle for engaging the article is located within the die and a position wherein that said portion of the spindle is removed from the die.

10. Apparatus according to claim 6 wherein means for moving the trimming means comprises a member having a predetermined profile formed thereon similar to that to be applied to the article, said trimming means being constrained to follow said profile.

11. Apparatus according to claim 10 wherein the moving means further comprises two slides whose directions of movement are at right-angles to one another and one of which is adapted to slide on the other, one of the ends of said one slide carrying the trimming means and the other one end of said one slide being adapted to follow the predetermined profile.

12. Apparatus according to claim 11 wherein the trimming means comprises a single point cutting tool.

13. Apparatus according to claim 12 wherein a rotatable means adapted to engage a surface of the article remote from the surface engageable by the spindle is movable to a position coaxial with the spindle, and the spindle and the rotatable means are relatively axially movable to clamp the article therebetween.

14. Apparatus according to claim 13 adapted to remove a plurality of articles from a single sheet of material and to trim surplus material from the equatorial regions of each of the articles said apparatus comprising a plurality of dies spindles and trimming means one for each article.

References Cited

UNITED STATES PATENTS

| | | |
|---|---|---|
| 1,039,674 | 9/1912 | Schatz. |
| 1,835,830 | 12/1931 | Vuille. |
| 2,177,928 | 10/1939 | Knudsen. |
| 2,682,700 | 7/1954 | Simoneau. |
| 3,142,117 | 7/1964 | Dier _____ 29—566 |
| 3,153,960 | 10/1964 | Allport _____ 82—1 |

THOMAS H. EAGER, Primary Examiner

U.S. Cl. X.R.

29—558, 556; 82—1; 83—925